US012780293B2

(12) United States Patent
Schoelzel

(10) Patent No.: US 12,780,293 B2
(45) Date of Patent: Nov. 3, 2026

(54) STEERING SYSTEM OF A VEHICLE

(71) Applicant: Bayerische Motoren Werke Aktiengesellschaft, Munich (DE)

(72) Inventor: Matthias Schoelzel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 747 days.

(21) Appl. No.: 17/911,934

(22) PCT Filed: Mar. 11, 2021

(86) PCT No.: PCT/EP2021/056140
§ 371 (c)(1),
(2) Date: Sep. 15, 2022

(87) PCT Pub. No.: WO2021/185663
PCT Pub. Date: Sep. 23, 2021

(65) Prior Publication Data
US 2023/0136880 A1 May 4, 2023

(30) Foreign Application Priority Data
Mar. 16, 2020 (DE) ..................... 10 2020 107 119.1

(51) Int. Cl.
*B62D 5/04* (2006.01)
*F16G 1/08* (2006.01)
(Continued)

(52) U.S. Cl.
CPC ............ *B62D 5/0424* (2013.01); *F16G 1/08* (2013.01); *F16G 1/16* (2013.01); *F16G 1/28* (2013.01); *F16H 7/023* (2013.01); *F16H 7/06* (2013.01)

(58) Field of Classification Search
CPC ....... B62D 5/0421; B62D 5/0424; F16H 7/02; F16H 7/023; F16H 7/06; F16G 1/28; F16G 5/20
See application file for complete search history.

(56) References Cited

U.S. PATENT DOCUMENTS 4,752,282 A * 6/1988 Habegger ................ F16G 1/16 474/271
6,960,145 B2 * 11/2005 Fraley, Jr. ............ F16H 7/1281 474/134
(Continued)

FOREIGN PATENT DOCUMENTS

CA 3 069 294 A1 1/2019
CN 101600614 A 12/2009
(Continued)

OTHER PUBLICATIONS

Chinese Office Action issued in Chinese application No. 202180018937.X dated Jun. 1, 2023, with English translation (Fourteen (14) pages).
(Continued)

*Primary Examiner* — Adam D Rogers
(74) *Attorney, Agent, or Firm* — Crowell & Moring LLP

(57) ABSTRACT

A steering system of a vehicle includes a toothed rack which is connectable to wheels of the vehicle to turn the wheels, a steering drive for displacing the toothed rack with a motor unit and a gear unit where the gear unit is connected to the toothed rack and converts a rotation of the motor unit into a displacement of the toothed rack, and a force transmission element disposed between the motor unit and gear unit. The force transmission element has a core element and a covering element which at least partially surrounds the core element. The core element has a greater strength than the covering element and has protruding regions for producing a positive-locking connection with respect to the motor unit
(Continued)

and the gear unit and has connection regions which connect the protruding regions. The covering element is in direct contact with the motor unit and the gear unit.

11 Claims, 2 Drawing Sheets

(51) Int. Cl.

| | |
|---|---|
| ***F16G 1/16*** | (2006.01) |
| ***F16G 1/28*** | (2006.01) |
| ***F16H 7/02*** | (2006.01) |
| ***F16H 7/06*** | (2006.01) |

(56) References Cited

U.S. PATENT DOCUMENTS

| | | | | |
|---|---|---|---|---|
| 7,137,918 | B2 * | 11/2006 | Nonnast | F16G 5/20 156/137 |
| 7,588,120 | B2 * | 9/2009 | Ha | B62D 5/0424 180/444 |
| 8,932,165 | B2 * | 1/2015 | Knox | F16G 1/28 474/204 |
| 9,927,001 | B2 * | 3/2018 | Di Meco | F16H 57/0489 |
| 10,377,410 | B2 | 8/2019 | Oh et al. | |
| 2004/0147351 | A1 | 7/2004 | Zona | |
| 2015/0060187 | A1 * | 3/2015 | Yamaguchi | B62D 5/0445 180/444 |
| 2019/0085938 | A1 * | 3/2019 | Yoshida | B62D 5/0424 |

FOREIGN PATENT DOCUMENTS

| | | | | | |
|---|---|---|---|---|---|
| CN | 102597569 | A | | 7/2012 | |
| CN | 106461017 | A | | 2/2017 | |
| CN | 106853842 | A | | 6/2017 | |
| CN | 107289069 | A | | 10/2017 | |
| CN | 110371183 | A | | 10/2019 | |
| DE | 603 05 429 | T2 | | 12/2006 | |
| DE | 10 2007 000 947 | A1 | | 4/2009 | |
| DE | 10 2011 051 289 | A1 | | 12/2012 | |
| DE | 10 2016 223 846 | A1 | | 6/2017 | |
| DE | 10 2016 007 542 | A1 | | 12/2017 | |
| KR | 20120027624 | A | * | 3/2012 | |
| WO | WO-9906736 | A1 | * | 2/1999 | B29D 29/08 |
| WO | WO 2015/155567 | A1 | | 10/2015 | |
| WO | WO-2019017100 | A1 | * | 1/2019 | B29D 29/08 |

OTHER PUBLICATIONS

PCT/EP2021/056140, International Search Report dated Jun. 15, 2021 (Two (2) pages).
German Search Report issued in German application No. 10 2020 107 119.1 dated Jan. 5, 2021, with Statement of Relevancy (Seven (7) pages).

* cited by examiner

STEERING SYSTEM OF A VEHICLE

BACKGROUND AND SUMMARY OF THE INVENTION

The present invention relates to a steering system of a vehicle. The invention further relates to a vehicle comprising such a steering system.

Steering systems for vehicles are known from the prior art. Generally, a toothed rack which can be connected to wheels via tie rods is used so that a displacement of the toothed rack leads to turning of the wheels. The toothed rack can be mechanically displaced directly by a steering wheel; in addition, a steering support system is known. For example, DE 10 2016 007 542 A1 sets out such a system. A motor drives a recirculating ball gear via a toothed belt, wherein the recirculating ball gear also acts on the toothed rack. Consequently, a steering force of a driver of the vehicle can be reduced by a portion of the force necessary for steering being applied by the support system.

If the vehicle allows automated driving, in particular highly automated driving, a steering force is no longer necessarily applied by the driver but instead partially or completely by the support system. In this case, it must be ensured in any case that the vehicle can be steered correctly.

Therefore, an object of the present invention is to provide a steering system of a vehicle which allows a safe and reliable steering of the vehicle with simple and cost-effective production and assembly.

Consequently, the object is achieved by a steering system of a vehicle which has a toothed rack and a steering drive. The toothed rack can be connected to wheels of the vehicle in order to achieve turning of the wheels by a displacement of the toothed rack. In particular, the toothed rack can be directly connected to this end to tie rods, wherein the tie rods are again connected directly to the wheels of the vehicle. The tie rod can consequently allow the wheels to be turned, and therefore the vehicle to be steered, as a result of a displacement. The steering drive is constructed to displace the toothed rack.

There is provision for the steering drive to have a motor unit and a gear unit. The gear unit is connected to the steering rod and constructed to convert the rotation of the motor unit into a displacement of the toothed rack. The gear unit is particularly a recirculating ball gear. Between the motor unit and the gear unit there is provided a force transmission element which acts in a positive-locking manner. Consequently, a torque can be transmitted from the motor unit to the gear unit. This allows a part-region of the gear unit to be rotated, wherein this rotation can be converted into a translation of the toothed rack. It is thereby possible to achieve a displacement of the toothed rack by means of the steering drive, and therefore steering of the vehicle.

The force transmission element has a core element and a covering element which at least partially surrounds the core element. The core element has a greater strength than the covering element. There is further provision for the core element to have protruding regions which are constructed to produce the positive-locking connection with respect to the motor unit and the gear unit. In particular, the protruding region is used to engage between two teeth of a toothed wheel of the motor unit or gear unit so that the positive-locking connection mentioned can be produced. The core element further has connection regions which connect the protruding regions. The covering element is in direct contact with the motor unit and the gear unit. The covering element and core element are consequently made from different materials, wherein the core element ensures that at any time a positive-locking connection with respect to the motor unit and the gear unit is present. As a result of the increased strength in comparison with the covering element, consequently, at least emergency operation is possible even if the covering element is worn or otherwise abraded or damaged. Consequently, a steering force can always be applied because the steering drive is capable at any time of displacing the toothed rack. The covering element may in particular be produced from an identical material to the one used for conventional force transmission elements so that for a user during normal operation no perceptible difference at all is produced. However, the covering element may also only partially surround the core element.

The force transmission element is in particular a toothed belt and/or a chain. Particularly in the case of a toothed belt, it is in principle possible for individual or several teeth to be rubbed away or for any damage to the teeth of the toothed belt to occur. In this case, a positive-locking connection would not necessarily be provided any more so that a force transmission between the steering drive and the toothed rack could not be reliably ensured. By using the core element with a greater strength than the covering element, a complete abrasion of the teeth of the toothed belt is prevented. At any time, consequently, it remains possible to provide the positive-locking connection between the toothed belt and the motor unit and between the toothed belt and gear unit. The same applies to the configuration of the force transmission element as a chain. In this instance, the protruding region of the core element can also ensure at any time that a reliable positive-locking connection with respect to toothed wheels of the motor unit and the gear unit can be produced. The configuration of the force transmission element as a toothed belt and/or chain is particularly advantageous for reducing vibrations and/or for damping noise during operation of the steering system.

The core element is advantageously composed of individual chain links. Consequently, the core element is independently capable of ensuring a force transmission between the motor unit and the gear unit. The core element can consequently ensure emergency operation even if the covering element is completely worn and/or abraded and/or destroyed. The individual chain links can be connected to each other particularly by positive-locking connection.

In a particularly advantageous manner, protruding members and connection members are provided. Consequently, the core element has protruding members which form the protruding regions. Similarly, the core element has connection members which form the connection regions. The protruding members and the connection members are particularly preferably connected in a positive-locking manner. Alternatively, the protruding members and the connection members can also be configured in such a manner that they are constructed integrally.

The covering element advantageously completely surrounds the core element. In particular, the covering element is constructed to form the force transmission element. Consequently, the core element is particularly completely embedded in the covering element. During normal operation, there is in particular provision for no contact at all between the motor unit and the core element and between the gear unit and the core element to occur. Instead, there is only contact between the covering element and the gear unit and the motor unit.

Preferably, an abrasion resistance of the core element is greater than that of the covering element. Consequently, the force transmission element is particularly prevented from being completely abraded, whereby at any time a positive-locking connection between the force transmission element and the motor unit and the gear unit is present. Therefore, it is possible at any time to apply a steering force by the steering drive.

The covering element is advantageously constructed to damp noise and/or vibrations during the force transmission between the motor unit and the gear unit. Consequently, it is particularly possible to operate the steering system with low noise and low vibrations. At the same time, it is possible for a user of the steering system or the vehicle to identify that the force transmission element is damaged. In this case, initially damage to, in particular abrasion of, the covering element occurs so that the damping properties of the force transmission element are no longer present. Consequently, the operating behavior of the steering system changes with regard to vibrations and noise, which can be identified by a user. Nevertheless, in such a case the function of the steering system is also ensured at all times.

The core element is preferably made from a plastics material. The plastics material is preferably homogeneous. Alternatively, the plastics material may preferably comprise a plurality of components. In particular, strength-reinforcing measures may be provided. Thus, it is advantageous if the plastics material is reinforced with fibers. Alternatively, the core element is made from a metal material. In particular, the plastics material and the metal material have a high level of mechanical strength. This strength is greater than the strength of the covering element, wherein the core element is particularly configured only with regard to a high mechanical strength, but does not have to be optimized with regard to other properties, such as noise damping and/or vibration damping. As a result of the corresponding construction of the core element as a robust component, the ability of the steering system to function at all times is ensured because a positive-locking connection between the motor unit and the gear unit is present at all times.

The covering element is preferably made from a plastics material. The plastics material is in particular an elastomer material. Consequently, it is particularly possible to achieve the above-described noise-damping and/or vibration-damping properties. In a particularly preferable manner, the covering element may be a conventional material for producing toothed belts.

The invention further relates to a vehicle. The vehicle has a steering system as described above. Consequently, it is possible at all times to steer the vehicle by the steering drive. As a result, the vehicle can be used in particular to be reliably driven in a highly automated manner.

In a particularly advantageous manner, the steering system is a steer-by-wire system. In such systems, no mechanical connections between a steering wheel and the wheels of the vehicle to be steered are present. In particular, no mechanical connection between the toothed rack and the steering wheel is present. The wheels of the vehicle are steered simply by means of the toothed rack being displaced by the steering drive. The above-described force transmission element ensures that this steering possibility is safeguarded at all times.

Additional details, features and advantages of the invention will result from the following description and the Figures.

DETAILED DESCRIPTION OF THE DRAWINGS

Figure 1:
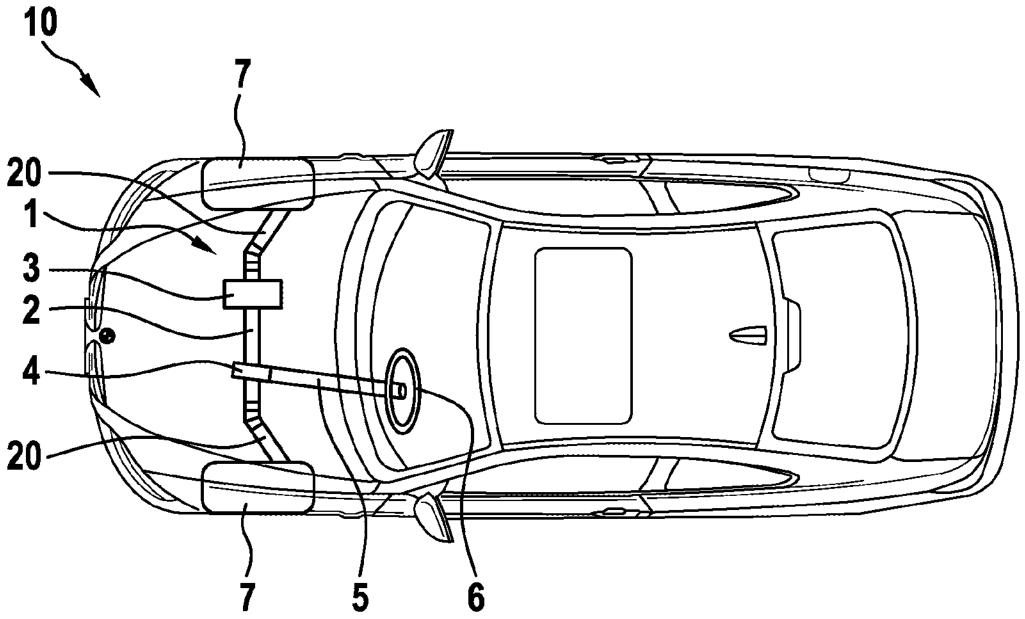
FIG. 1 shows a schematic view of a vehicle according to an embodiment of the invention.

FIG. 1 schematically shows a vehicle 10 according to an embodiment of the invention. The vehicle 10 has a steering system 1. The steering system 1 in turn has a toothed rack 2 and a steering drive 3. The toothed rack 2 is connected to wheels 7 of the vehicle 10 via tie rods 20 so that a displacement of the toothed rack 2 in a transverse vehicle direction results in the wheels 7 being turned. In this manner, it becomes possible to steer the vehicle 10.

A displacement of the toothed rack 2 can be carried out, on the one hand, by the steering drive 3, on the other hand, by a steering column 5 and a steering wheel 6 secured thereto. If a steering movement is applied to the steering wheel 6 by the driver, this rotation via the steering column and a steering gear mechanism 4 is transmitted to the toothed rack 2 so that a displacement of the toothed rack 2 is carried out. This results in the vehicle 10 being steered. In order to support the driver during the steering operation, the steering drive 3 further applies a force to the toothed rack 2 which supports the steering intention of the driver. Consequently, a smaller torque has to be applied to the steering wheel 6 than would be necessary to move the wheels 7. Instead, the steering drive 3 takes up a portion of the necessary work.

In automatically driven vehicles or highly automatically driven vehicles, the steering wheel 6, steering columns and steering gear mechanism 4 can be dispensed with or the steering wheel 6 can be brought into a position which is folded away and which cannot be reached directly by the driver. In such a state, the steering drive 3 alone can take up the steering of the vehicle 10 by corresponding displacements of the toothed rack 2 being generated. In a preferred embodiment, the steering column can also be completely dispensed with, wherein a steer-by-wire system is constructed. In this case, steering inputs at the steering wheel 6 are detected by means of sensors and transmitted to the steering drive 3 as control signals. The steering of the vehicle 10 is consequently carried out only by displacing the toothed rack 2 by means of the steering drive 3. It is not possible to directly move the toothed rack 2 as a result of the absence of any mechanical connection between the toothed rack 2 and steering wheel 6 and there is no provision for this.

Figure 2:
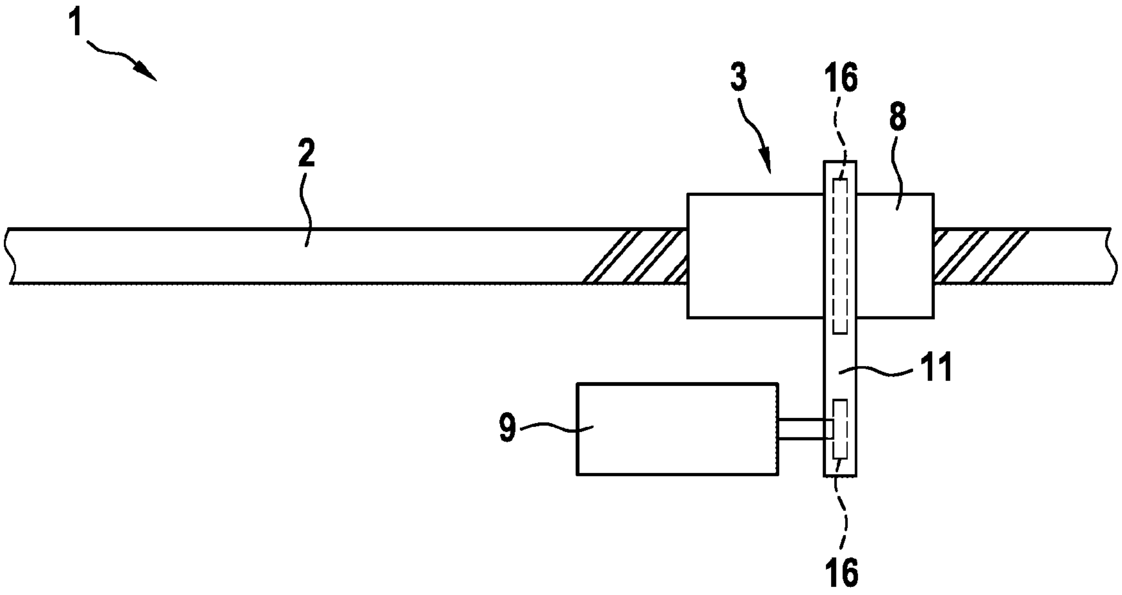
FIG. 2 shows a schematic view of a steering system of the vehicle according to the embodiment of the invention.

FIG. 2 schematically shows the steering system 1 of the vehicle 10. The steering system 1 comprises the steering drive 3 in addition to the toothed rack 2, wherein the steering drive 3 is constructed to displace the toothed rack 2. The steering drive 3 again has a gear unit 8 and a motor unit 9. The gear unit 8 is in particular a recirculating ball gear and is used to convert a rotation of the motor unit 9 into a translation of the threaded rod 2.

A force transmission between the motor unit 9 and the gear unit 8 is carried out via a force transmission element 11. In the embodiment shown, the force transmission element 11 is a toothed belt which extends between two toothed wheels 16, wherein one of the toothed wheels 16 is part of the motor unit 9 and part of the gear unit 8. In an alternative embodiment, a chain or another positive—locking force transmission element could also be used in place of the toothed belt.

The force transmission element 11 is configured in such a manner that, on the one hand, quiet and low-vibration running is achieved. Consequently, the operation of the steering drive 3 is low in terms of vibrations and noise. On the other hand, the force transmission element 11 is configured to ensure a safe and reliable force transmission between the motor unit 9 and the gear unit 8 by a positive-locking connection with respect to the toothed wheels 16 of the motor unit 9 and the gear unit 8 being present at all times. In particular, a complete abrasion of the teeth of the force transmission element 11 in the form of a toothed belt is prevented. Consequently, particularly the advantage of conventional toothed belts, in particular the quiet operation and vibration damping, is afforded, wherein additionally a reliable force transmission between the motor unit 9 and the gear unit 8 is provided. As a result, the force transmission element 11 is particularly suitable for use in vehicles with automated or highly automated driving modes because it is ensured at all times that the steering drive 9 can steer the vehicle 10.

Figure 3:
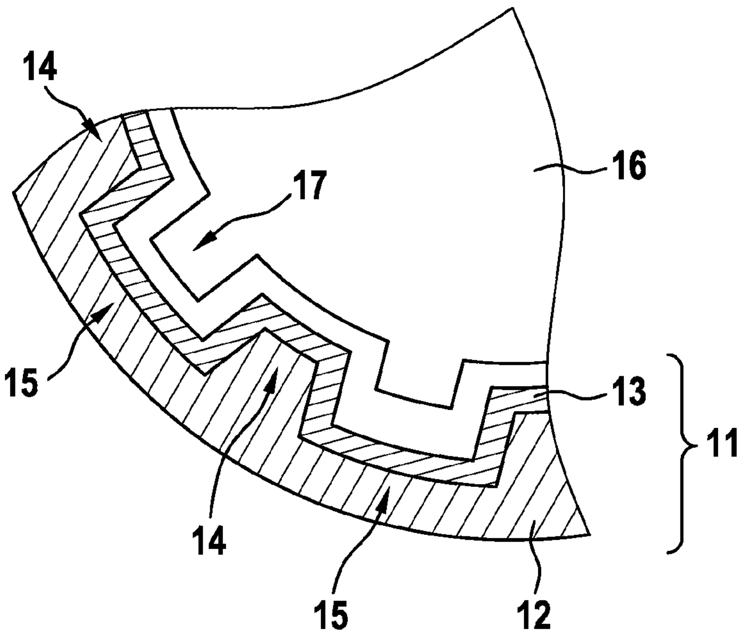
FIG. 3 shows a schematic view of a force transmission element of the steering system of the vehicle according to the embodiment of the invention.

FIG. 3 shows an embodiment of the force transmission element 11 in the form of a toothed belt. In addition, a corresponding toothed wheel 16 is schematically illustrated. The toothed wheel 16 has a plurality of teeth, wherein a positive-locking connection of the force transmission element 11 with respect to these teeth 17 is provided.

The force transmission element 11 has a core element 12 and a covering element 13, wherein the covering element 13 at least partially surrounds the core element 12. In the embodiment shown in FIG. 3, the covering element only partially surrounds the core element 12. The core element 12 is in particular a component with a greater level of strength than that of the covering element 13. The covering element 13 is in particular an elastomer material or another plastics material, wherein the covering element 13 is constructed to damp vibrations and/or to damp oscillations. In particular, the covering element 13 is made from a conventional material for toothed belts. Consequently, the described quiet running and low vibration properties are achieved.

By using the core element 12 which is particularly made from a metal material or plastics material and which has a greater strength than the covering element 13, a reliable positive-locking connection with respect to the toothed wheel 16 is always achieved. To this end, the core element 12 has protruding regions 14 and connection regions 15, wherein the protruding regions 14 engage between the teeth 17 of the toothed wheel 16 and consequently ensure the positive-locking connection. The connection regions 15 serve to connect the individual protruding regions 14. In the configuration of the core element 12, quiet running and/or low vibration properties can particularly remain completely disregarded so that only a great strength is provided. Should the covering element 13 become damaged and/or abraded and/or otherwise worn, at least emergency operation can be further ensured by the core element 12. In particular, complete abrasion of the teeth of the force transmission element 11 in the form of a toothed belt is prevented because at least the protruding regions 14 of the core element 12 are maintained. The protruding regions 14 and the connection regions 15 can be formed in particular by the same component or by different components.

Figure 4:
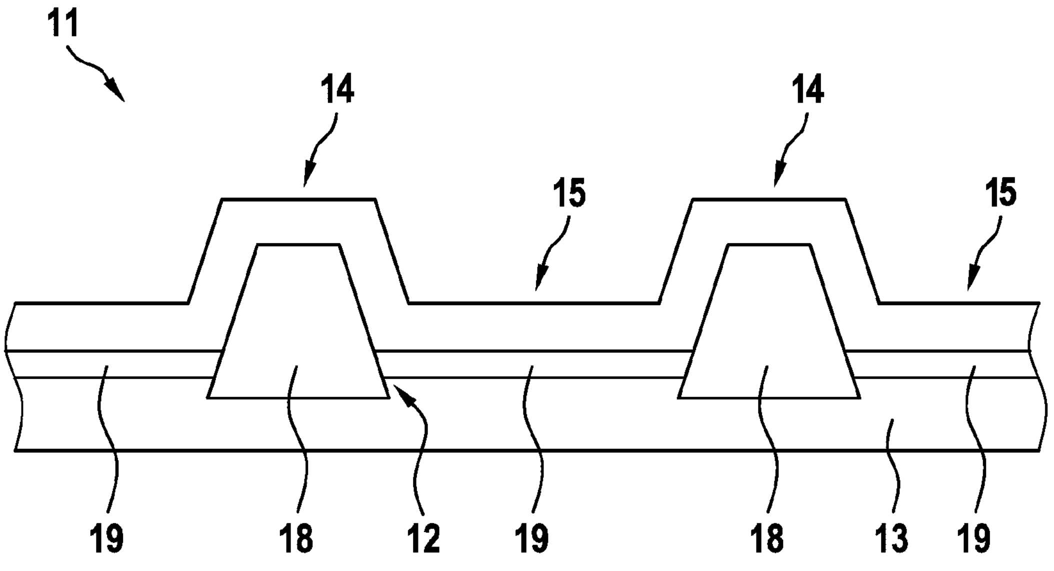
FIG. 4 shows a schematic view of an alternative embodiment of the force transmission element of the steering system of the vehicle according to the embodiment of the invention.

FIG. 4 shows another preferred embodiment of the force transmission element 11, wherein, in the alternative embodiment shown in FIG. 4, the core element 12 is formed by a chain. The covering element 13 completely surrounds the core element 12 and is further used particularly to finally form the force transmission element 11 as a toothed belt. The core element 12 which is in the form of a chain is consequently not visible during normal operation of the force transmission element 11.

The core element 12 has protruding members 18 which form the protruding regions 14. Furthermore, the core element 12 has connection members 19 which form the connection regions 15. The protruding members 18 and the connection members 19 are advantageously connected in a positive-locking manner and form in particular a chain. Alternatively, the connection members 19 and protruding members 18 can also be constructed integrally. In a particularly advantageous manner, the connection members 19 and the protruding members 18 are made from a metal material.

If wear to the covering element 13 occurs, at least the protruding members 18 can ensure a positive-locking connection with respect to the corresponding toothed wheels 16 while the connection members 19 allow a reliable connection of the protruding members 18. A positive-locking connection between the motor unit 9 and the gear unit 8 is thereby provided at all times so that the steering drive 3 can ensure steering of the vehicle 10 at all times. If, however, the covering element 13 is not worn and is present as provided, the covering element 13 can damp vibrations and/or noise, whereby the same advantages as in conventional toothed belts are afforded. A driver of the vehicle 10 can identify wear and/or damage to the covering element 13 because in this case the damping properties mentioned are no longer provided so that the operation of the steering drive 3 changes with regard to noise and vibration.

In summary, consequently, the invention allows during normal operation the covering element 13 to produce the same operating state as conventional toothed belts. However, a complete abrasion of the teeth of the toothed belt, as can occur in the prior art, is prevented as a result of the core element 12 so that the core element 12 can produce at least emergency operation of the steering drive 3. Alternatively, the entire force transmission element 11 may also be in the form of a chain instead of in the form of a toothed belt. In this case, there is also provision for the protruding regions 14 to engage in intermediate spaces of the teeth between the teeth 17 of the toothed wheels 16 and thereby to ensure a positive-locking connection.

As a result of the corresponding embodiment of the force transmission element 11, it is possible for the steering drive 3 to be able to continuously ensure steering of the vehicle 10. Consequently, the steering drive 3 and the steering system 1 are suitable for vehicles 10 which have automated or highly automated driving modes.

The steering drive 3 and the steering system 1 are also particularly suitable for vehicles 10 which are provided with a steer-by-wire system and which do not have any mechanical connection between the toothed rack 2 and steering wheel 6, that is to say, in particular do not have a steering column 5.

LIST OF REFERENCE CHARACTERS

1 Steering system
2 Toothed rack
3 Steering drive
4 Steering gear mechanism
5 Steering column
6 Steering wheel
7 Wheel
8 Gear unit

9 Motor unit
10 Vehicle
11 Force transmission element
12 Core element
13 Covering element
14 Protruding region
15 Connection region
16 Toothed wheel
17 Tooth
18 Protruding member
19 Connection member
20 Tie rod

The invention claimed is:

1. A steering system of a vehicle, comprising:
a toothed rack which is connectable to wheels of the vehicle to turn the wheels by a displacement of the toothed rack;
a steering drive for displacing the toothed rack, wherein the steering drive has a motor unit and a gear unit and wherein the gear unit is connected to the toothed rack and converts a rotation of the motor unit into a displacement of the toothed rack; and
a force transmission element disposed between the motor unit and gear unit and which acts in a positive-locking manner;
wherein the force transmission element has a core element and a covering element which contacts and at least partially surrounds the core element and has a homogeneous material construction;
wherein the core element has a greater strength than the covering element;
wherein the core element has protruding regions for producing a positive-locking connection with respect to the motor unit and the gear unit and has connection regions which connect the protruding regions; and
wherein the covering element is in direct contact with the motor unit and the gear unit.

2. The steering system according to claim 1, wherein the force transmission element is a toothed belt and/or a chain.

3. The steering system according to claim 1, wherein the core element is comprised of individual chain links.

4. The steering system according to claim 1, wherein the core element has protruding members which form the protruding regions and has connection members which form the connection regions and wherein the protruding members and the connection members are connected in a positive-locking manner or are constructed integrally.

5. The steering system according to claim 1, wherein the covering element completely surrounds the core element.

6. The steering system according to claim 1, wherein an abrasion resistance of the core element is greater than an abrasion resistance of the covering element.

7. The steering system according to claim 1, wherein the covering element damps noise and/or vibrations during a force transmission between the motor unit and the gear unit.

8. The steering system according to claim 1, wherein the core element is a plastics material or a metal material.

9. The steering system according to claim 1, wherein the covering element is a plastics material.

10. The steering system according to claim 9, wherein the plastics material is an elastomer material.

11. A vehicle, comprising:
the steering system according to claim 1.

* * * * *